(12) United States Patent
Lee et al.

(10) Patent No.: US 7,970,491 B2
(45) Date of Patent: Jun. 28, 2011

(54) ROBOT LOCALIZATION SYSTEM

(75) Inventors: Hyoung-ki Lee, Gyeonggi-do (KR);
Jay-woo Kim, Gyeonggi-do (KR);
Seok-won Bang, Seoul (KR)

(73) Assignee: Samsung Electronics Co., Ltd.,
Suwon-Si (KR)

( * ) Notice: Subject to any disclaimer, the term of this patent is extended or adjusted under 35 U.S.C. 154(b) by 1872 days.

(21) Appl. No.: 10/747,228

(22) Filed: Dec. 30, 2003

(65) Prior Publication Data

US 2004/0158354 A1 Aug. 12, 2004

(30) Foreign Application Priority Data

Dec. 30, 2002 (KR) .................. 10-2002-0087154

(51) Int. Cl.
*G06F 19/00* (2011.01)
*G05B 13/02* (2006.01)
*B60T 7/16* (2006.01)

(52) U.S. Cl. .............. 700/245; 700/30; 700/33; 700/50; 700/55; 180/168; 180/169; 318/568.12; 318/568.16; 318/568.24

(58) Field of Classification Search .................. 701/300, 701/301, 218; 342/46, 47, 146, 147, 450, 342/453, 463, 457, 125; 700/50, 30, 33, 700/55
See application file for complete search history.

(56) References Cited

U.S. PATENT DOCUMENTS

| | | | |
|---|---|---|---|
| 4,674,048 A | | 6/1987 | Okumura |
| 4,679,152 A | | 7/1987 | Perdue |
| 4,758,691 A | | 7/1988 | De Bruyne |
| 4,777,416 A | * | 10/1988 | George et al. ............ 318/568.12 |
| 4,792,870 A | * | 12/1988 | Pinson ........................ 360/78.14 |
| 4,809,936 A | | 3/1989 | Whitaker |
| 5,307,271 A | | 4/1994 | Everett et al. |

(Continued)

FOREIGN PATENT DOCUMENTS

EP 0 502 249 A2 11/1991

(Continued)

OTHER PUBLICATIONS

NPL—Kalman filter as Observer in autonomous robot control.*

(Continued)

*Primary Examiner* — Khoi Tran
*Assistant Examiner* — Ian Jen
(74) *Attorney, Agent, or Firm* — Staas & Halsey LLP

(57) ABSTRACT

A robot localization system is provided. The robot localization includes a robot, which moves within a predetermined space and performs predetermined tasks, and a docking station corresponding to a home position of the robot. The docking station includes a first transmitting unit, which transmits a sound wave to detect a position of the robot; and a second transmitting unit, which transmits a synchronizing signal right when the sound wave is transmitted. The robot includes a first receiving unit, which comprises at least two sound sensors receiving the sound wave incident onto the robot; a second receiving unit, which receives the synchronizing signal incident onto the robot; a distance calculation unit, which calculates a distance between the first transmitting unit and the first receiving unit using a difference between an instant of time when the synchronizing signal is received and an instant of time when the sound wave is received; and an incident angle calculation unit, which calculates an incident angle of the sound wave onto the robot using a difference between receiving times of the sound wave in the at least two sound sensors comprised in the first receiving unit.

5 Claims, 9 Drawing Sheets

U.S. PATENT DOCUMENTS

| | | | |
|---|---|---|---|
| 5,652,593 | A | 7/1997 | Rench et al. |
| 5,794,166 | A | 8/1998 | Bauer et al. |
| 5,948,043 | A * | 9/1999 | Mathis ................ 701/208 |
| 6,138,063 | A | 10/2000 | Himeda |
| 6,254,035 | B1 | 7/2001 | Howard et al. |
| 6,278,917 | B1 | 8/2001 | Bauer et al. |
| 6,285,971 | B1 * | 9/2001 | Shah et al. ................ 703/2 |
| 6,308,114 | B1 * | 10/2001 | Kim ................ 700/245 |
| 6,338,013 | B1 | 1/2002 | Ruffner |
| 6,370,453 | B2 | 4/2002 | Sommer |
| 6,415,223 | B1 * | 7/2002 | Lin et al. ................ 701/208 |
| 6,438,456 | B1 * | 8/2002 | Feddema et al. ................ 700/245 |
| 6,459,955 | B1 * | 10/2002 | Bartsch et al. ................ 700/245 |
| 6,496,754 | B2 | 12/2002 | Song et al. |
| 6,567,711 | B1 * | 5/2003 | Hosek et al. ................ 700/55 |
| 6,580,246 | B2 * | 6/2003 | Jacobs ................ 318/568.16 |
| 6,586,908 | B2 | 7/2003 | Peterson et al. |
| 6,611,234 | B2 * | 8/2003 | Fullerton et al. ................ 342/458 |
| 6,615,108 | B1 | 9/2003 | Peless et al. |
| 6,732,826 | B2 | 5/2004 | Song et al. |
| 6,748,297 | B2 | 6/2004 | Song et al. |
| 7,031,805 | B2 | 4/2006 | Lee et al. |
| 7,038,589 | B2 * | 5/2006 | Schmidt et al. ................ 340/573.1 |
| 7,173,391 | B2 | 2/2007 | Jones et al. |
| 7,188,000 | B2 | 3/2007 | Chiappetta et al. |
| 7,248,951 | B2 * | 7/2007 | Hulden ................ 701/23 |
| 2002/0153185 | A1 | 10/2002 | Song et al. |
| 2003/0001777 | A1 * | 1/2003 | Johnson ................ 342/387 |
| 2004/0158354 | A1 | 8/2004 | Lee et al. |
| 2004/0204804 | A1 | 10/2004 | Lee et al. |
| 2004/0211444 | A1 | 10/2004 | Taylor et al. |

FOREIGN PATENT DOCUMENTS

| | | |
|---|---|---|
| EP | 0 502 249 A3 | 11/1991 |
| EP | 0 732 641 A2 | 9/1996 |
| EP | 0 732 641 A3 | 5/1997 |
| JP | 2000-056006 | 2/2000 |
| JP | 2001-125641 | 5/2001 |
| KR | 2000-0066728 A | 11/2000 |
| KR | 2002-0033303 A | 5/2002 |

OTHER PUBLICATIONS

NPL—Kalm fitler as compensator for robot docking return.*
J. Borenstein et al., "Mobile Robot Positioning—Sensors and Techniques", Invited paper for the Journal of Robotic Systems, Special Issue on Mobile Robots. vol. 14, No. 4, pp. 231-249.
U.S. Appl. No. 10/819,984, filed Apr. 8, 2004, Hyoung-ki Lee et al., Samsung Electronics Co., Ltd.
U.S. Appl. No. 10/823,548, filed Apr. 14, 2004, Hyoung-ki Lee et al., Samsung Electronics Co., Ltd.
U.S. Office Action dated Sep. 21, 2007 issued in co-pending U.S. Appl. No. 10/823,548.
U.S. Office Action dated Dec. 12, 2007 issued in co-pending U.S. Appl. No. 10/823,548.
U.S. Office Action dated Jun. 9, 2008 issued in co-pending U.S. Appl. No. 10/823,548.
U.S. Notice of Allowance dated Feb. 3, 2009 issued in co-pending U.S. Appl. No. 10/823,548.
U.S. Office Action dated Aug. 29, 2007 issued in co-pending U.S. Appl. No. 10/819,984.
U.S. Office Action dated Jun. 18, 2008 issued in co-pending U.S. Appl. No. 10/819,984.
U.S. Office Action dated Mar. 24, 2009 issued in co-pending U.S. Appl. No. 10/819,984.
European Search Report.

* cited by examiner

ROBOT LOCALIZATION SYSTEM

This application claims the priority of Korean Patent Application No. 2002-87154, filed on Dec. 30, 2002, in the Korean Intellectual Property Office, the disclosure of which is incorporated herein in its entirety by reference.

BACKGROUND OF THE INVENTION

1. Field of the Invention

The present invention relates to a robot control, and more particularly, to a robot localization system for controlling a position and an orientation of a robot.

2. Description of the Related Art

Methods or apparatuses for localization of a robot uses dead-reckoning such as odometry and inertial navigation, for measuring a relative position of a robot; a global positioning system (GPS), active beacons, etc., for measuring an absolute position of a robot; and a magnetic compass for measuring an absolute orientation of a robot. Approaches for robot localization are described in detail in "Mobile Robot Positioning Sensors and Techniques" by J. Borenstein, H. R. Everett, L. Feng, and D. Wehe.

FIG. 1 is a diagram illustrating a conventional technique of detecting a position of a robot using three beacons. Positions A and B are detected using beacon 1 and beacon 2. Accordingly, beacon 3 is required to exactly detect the position A. The GPS is based on this principle. However, only positions without an orientation can be detected with this conventional technique.

Korean Patent Publication No. 2000-66728, entitled "Robot Having Function of Detecting Sound Direction and Motion Direction and Function of Automatic Intelligent Charge and Method of Controlling the Same," discloses an algorithm for measuring a sound direction and controlling the robot to move to an automatic charger. When the charger generates a sound having a particular frequency, the robot detects a direction of the sound, locks on the detected direction, and docks to the charger. According to this technique, only a motion direction of a robot can be measured and controlled.

Korean Patent Publication No. 2002-33303, entitled "Apparatus for Detecting Position of Robot in Robot Soccer Game," discloses an apparatus for detecting a position of a robot using a plurality of beacons. Here, only positions without an orientation are detected.

SUMMARY OF THE INVENTION

The present invention provides a method and apparatus for performing localization using a single beacon.

The present invention also provides a robot localization system using a radio wave.

According to an aspect of the present invention, there is provided a robot localization system including a robot, which moves within a predetermined space and performs predetermined tasks, and a docking station corresponding to a home position of the robot. The docking station includes a first transmitting unit, which transmits a sound wave to detect a position of the robot; and a second transmitting unit, which transmits a synchronizing signal right when the sound wave is transmitted. The robot includes a first receiving unit, which comprises at least two sound sensors receiving the sound wave incident onto the robot; a second receiving unit, which receives the synchronizing signal incident onto the robot; a distance calculation unit, which calculates a distance between the first transmitting unit and the first receiving unit using a difference between an instant of time when the synchronizing signal is received and an instant of time when the sound wave is received; and an incident angle calculation unit, which calculates an incident angle of the sound wave onto the robot using a difference between receiving times of the sound wave in the at least two sound sensors comprised in the first receiving unit. The sound wave is a supersonic wave.

Preferably, the robot localization system further includes an encoder, which measures a positional change between a previous position and a current position of the robot and a directional change between a previous orientation and a current orientation of the robot.

Preferably, the robot localization system further includes a state observer, which estimates a current position and a current orientation of the robot with respect to the docking station using the distance between the first transmitting unit and the first receiving unit, the incident angle of the sound wave, the positional change, and the directional change. The state observer includes a Kalman filter.

Preferably, the robot localization system further includes a unit for measuring an absolute azimuth of the robot. Preferably, the robot localization system further includes a Kalman filter.

According to another aspect of the present invention, there is provided a robot localization system including a robot and a docking station. The robot includes a first transmitter which transmits a first radio wave, a second receiver which receives a second radio wave, and a distance calculator which calculates a distance between the robot and the docking station. The docking station includes a first receiver which receives the first radio wave, and a second transmitter which transmits the second radio wave a predetermined period of time after the first radio wave is received. The distance calculator calculates the distance between the robot and the docking station using a difference between an instant of time when the first radio wave is transmitted and an instant of time when the second radio wave is received and a predetermined period of time from the reception of the first radio wave to the transmission of the second radio wave.

The second receiver may include at least two sensors which receives the second radio wave, and the robot further includes an incident angle calculator which calculates an incident angle of the second radio wave onto the robot using a difference between receiving times of the second radio wave in the at least two sensors comprised in the second receiver.

The robot localization system further includes an encoder, which measures a positional change between a previous position and a current position of the robot and a directional change between a previous orientation and a current orientation of the robot.

The robot localization system further includes a state observer, which estimates a current position and a current orientation of the robot with respect to the docking station using the distance between the robot and the docking station, the incident angle of the second radio wave, the positional change, and the directional change. Here, the state observer includes a Kalman filter.

The robot localization system may further include a unit for measuring an absolute azimuth of the robot. Here, the robot localization system further includes a Kalman filter.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Hereinafter, the structure and operation of a robot localization system according to the present invention will be described in detail with reference to the attached drawings.

A robot localization system according to the present invention includes a robot, which moves within a predetermined space and performs predetermined tasks, and a docking station corresponding to a home position of the robot.

Figure 1:
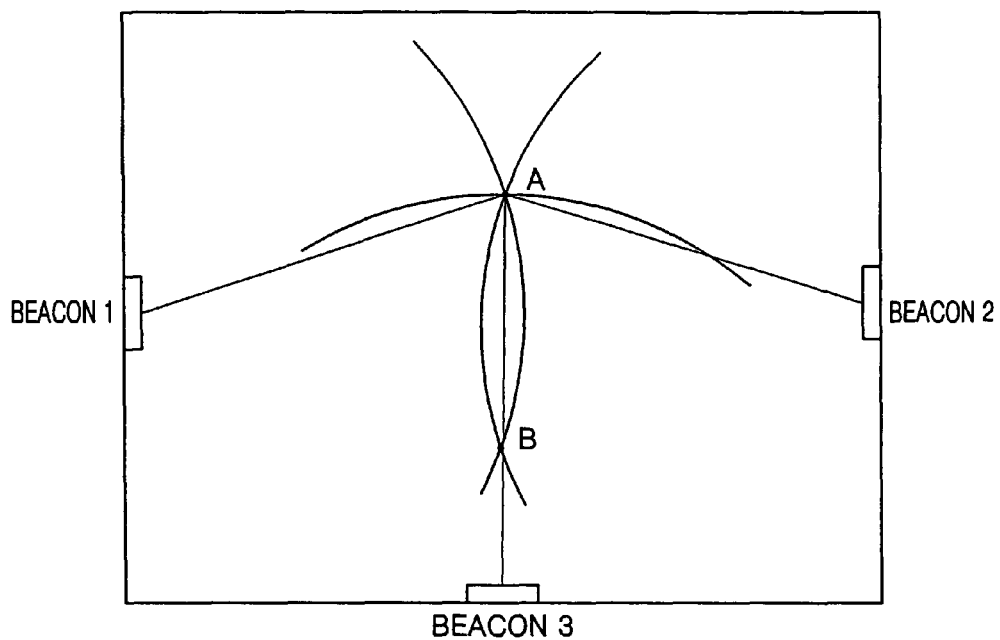
FIG. 1 is a diagram illustrating a conventional technique of detecting a position of a robot using three beacons.
Figure 2:
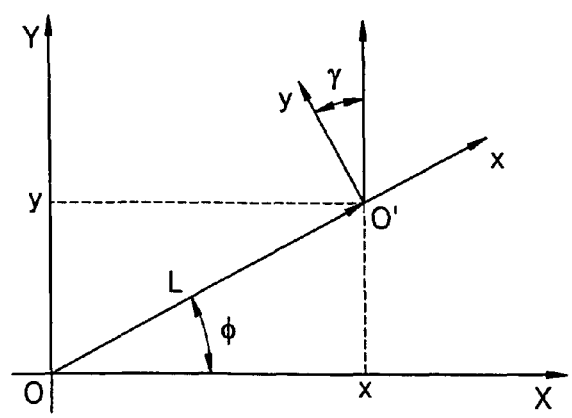
FIG. 2 shows a coordinate system in which a positional relationship between a docking system and a robot is expressed as (x, y, γ)

FIG. 2 shows a coordinate system in which a positional relationship between the docking system and the robot is expressed as (x, y, γ). Here, coordinates (x, y) indicates a position of the robot (O') on a plane with the docking station (O) as the origin, and γ indicates a direction toward which the robot is oriented in a current posture. The coordinates (x, y) can be replaced with coordinates (L, φ) in a polar coordinate system.

Figure 3:
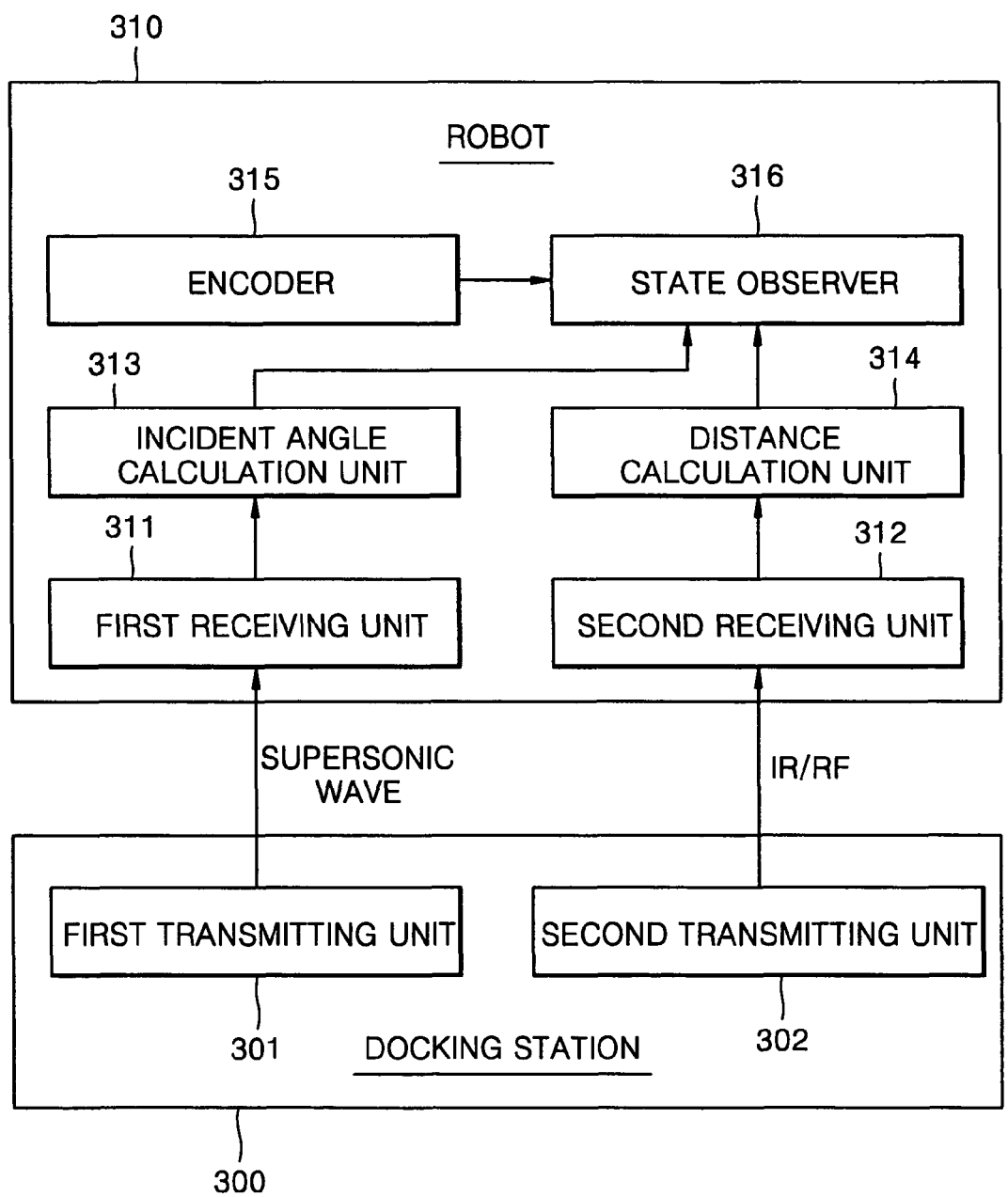
FIG. 3 is a block diagram of a robot localization system according to an embodiment of the present invention.

FIG. 3 is a block diagram of a robot localization system according to an embodiment of the present invention. The robot localization system includes a docking station 300 and a robot 310. Preferably, the docking station 300 includes a first transmitting unit 301 and a second transmitting unit 302. Preferably, the robot 310 includes a first receiving unit 311, a second receiving unit 312, an incident angle calculation unit 313, a distance calculation unit 314, an encoder 315, and a state observer 316.

The first transmitting unit 301 transmits a signal, for example, a supersonic wave, in order to detect a position of the robot 310. The second transmitting unit 302 transmits a synchronizing signal right when the supersonic wave is transmitted in order to measure a distance between the docking station 300 and the robot 310 using a time difference between transmission and reception of the supersonic wave. The synchronizing signal is much faster than the supersonic wave and can be implemented by infrared (IR) or radio frequency (RF).

The first receiving unit 311 includes two or more supersonic sensors which receive the supersonic wave which is transmitted from the docking station 300 and incident onto the robot 310. The second receiving unit 312 receives the synchronizing signal transmitted from the docking station 300 and incident onto the robot 310. The incident angle calculation unit 313 calculates an incident angle θ of the supersonic wave onto the robot 310 using a difference between receiving times of the supersonic wave in the two or more supersonic sensors provided in the first receiving unit 311. The distance calculation unit 314 calculates a distance between the first transmitting unit 301 and the first receiving unit 311 using a difference between an instant of time when the synchronizing signal is received and an instant of time when the supersonic wave is received. In other words, a distance L between the docking station 300 and the robot 310 is calculated.

Figure 4:
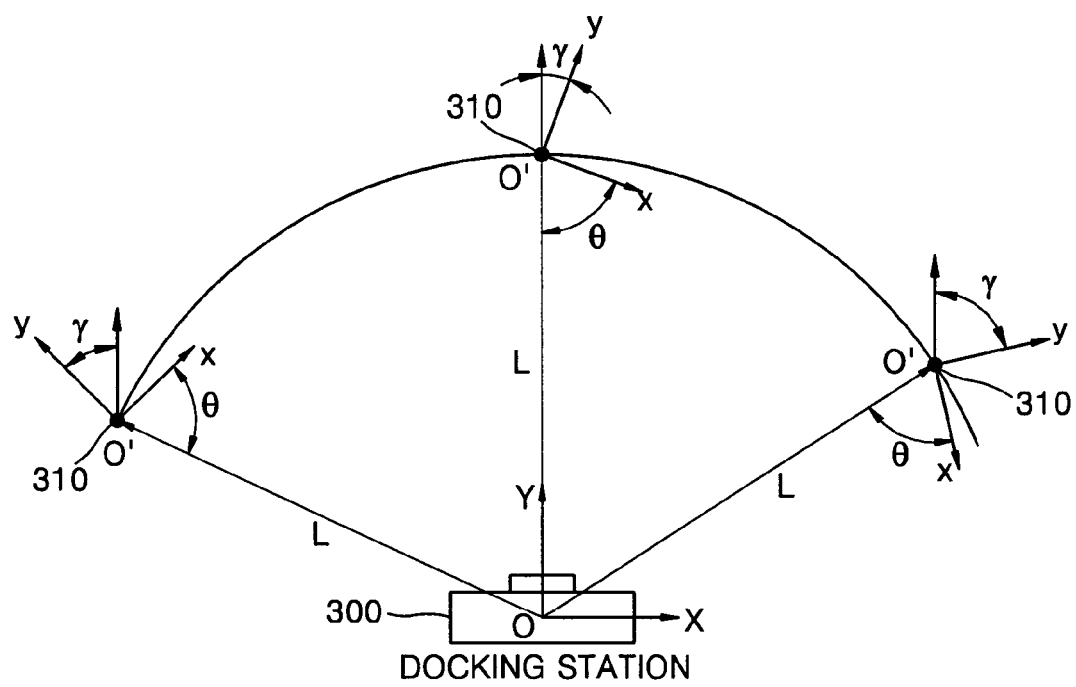
FIG. 4 shows a coordinate system in which a positional relationship between a docking system and a robot is expressed as (L, θ, γ)

As shown in FIG. 4, a positional relationship between the docking station 300 and the robot 310 can be also expressed as (L, θ, γ). Here, L indicates a distance between a reference position of the docking station 300 and the robot 310, θ indicates an incident angle of the supersonic wave with an x-axis of the robot 310, i.e., a reference axis of the robot 310, and γ indicates a direction toward which the robot 310 is oriented.

Figure 5:
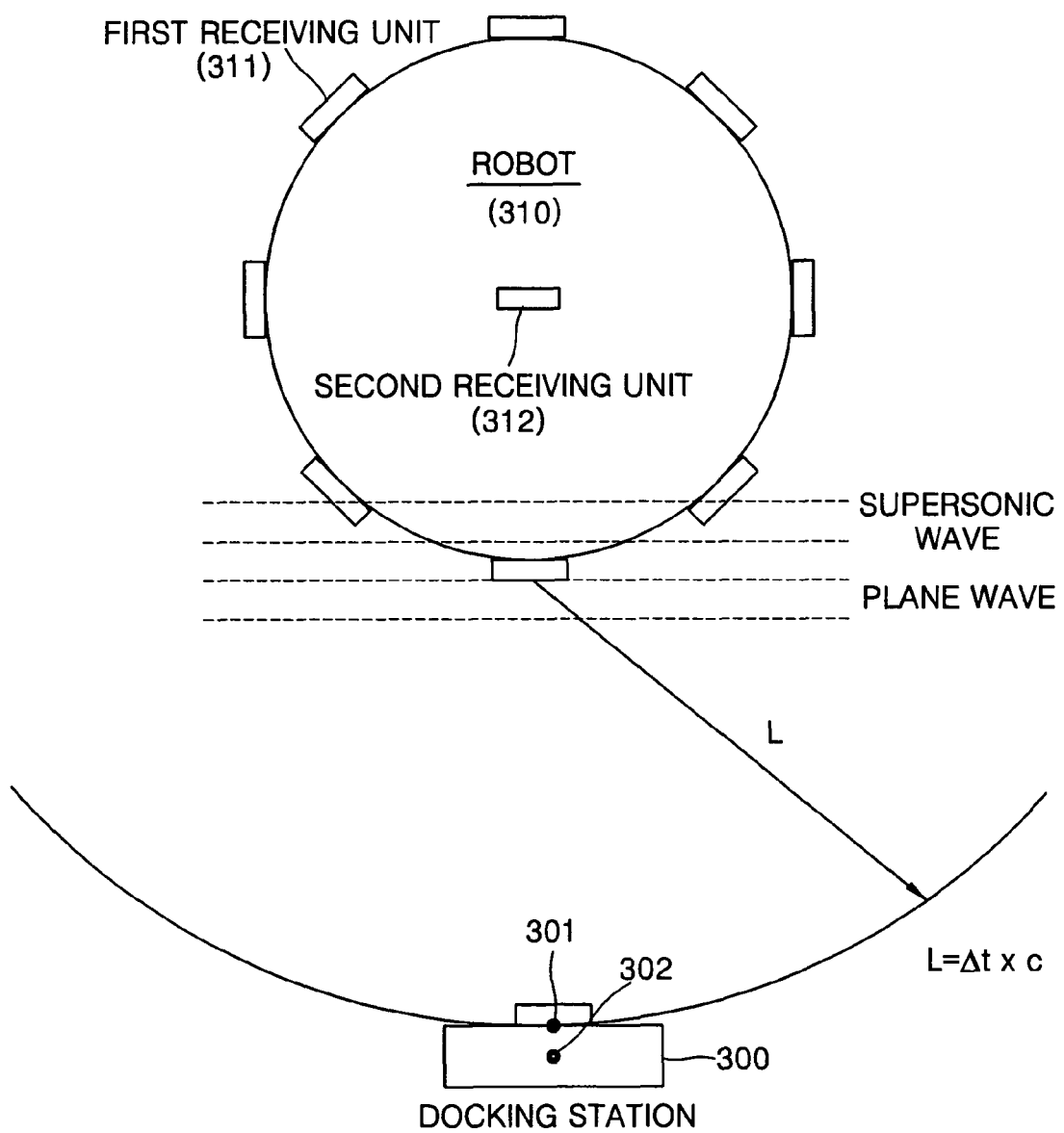
FIG. 5 illustrates a method of measuring a distance, which is performed by a robot localization system according to an embodiment of the present invention.

FIG. 5 illustrates a method of measuring a distance, which is performed by a robot localization system according to the present invention. The distance calculation unit 314 calculates a distance L according to Formula (1) using the supersonic wave and the synchronizing signal.

$$L = \Delta t \cdot c_s \quad (1)$$

Here, $c_S$ indicates the speed of sound, i.e., 340 m/sec, and $\Delta t$ indicates a time difference between transmission of a supersonic wave from the docking station 300 and reception of the supersonic wave by the robot 310.

Referring to FIG. 5, the first transmitting unit 301 of the docking station 300 transmits a supersonic wave, and simultaneously, the second transmitting unit 302 transmits a synchronizing signal, for example, an RF or an IR signal. Then, the robot 310 can measure the time difference $\Delta t$ between receiving time of the synchronizing signal by the second receiving unit 312 and receiving time of the supersonic wave by the first receiving unit 311. Accordingly, the distance L can be calculated by multiplying the time difference $\Delta t$ by the speed of sound c (=340 m/sec).

Figure 6A:
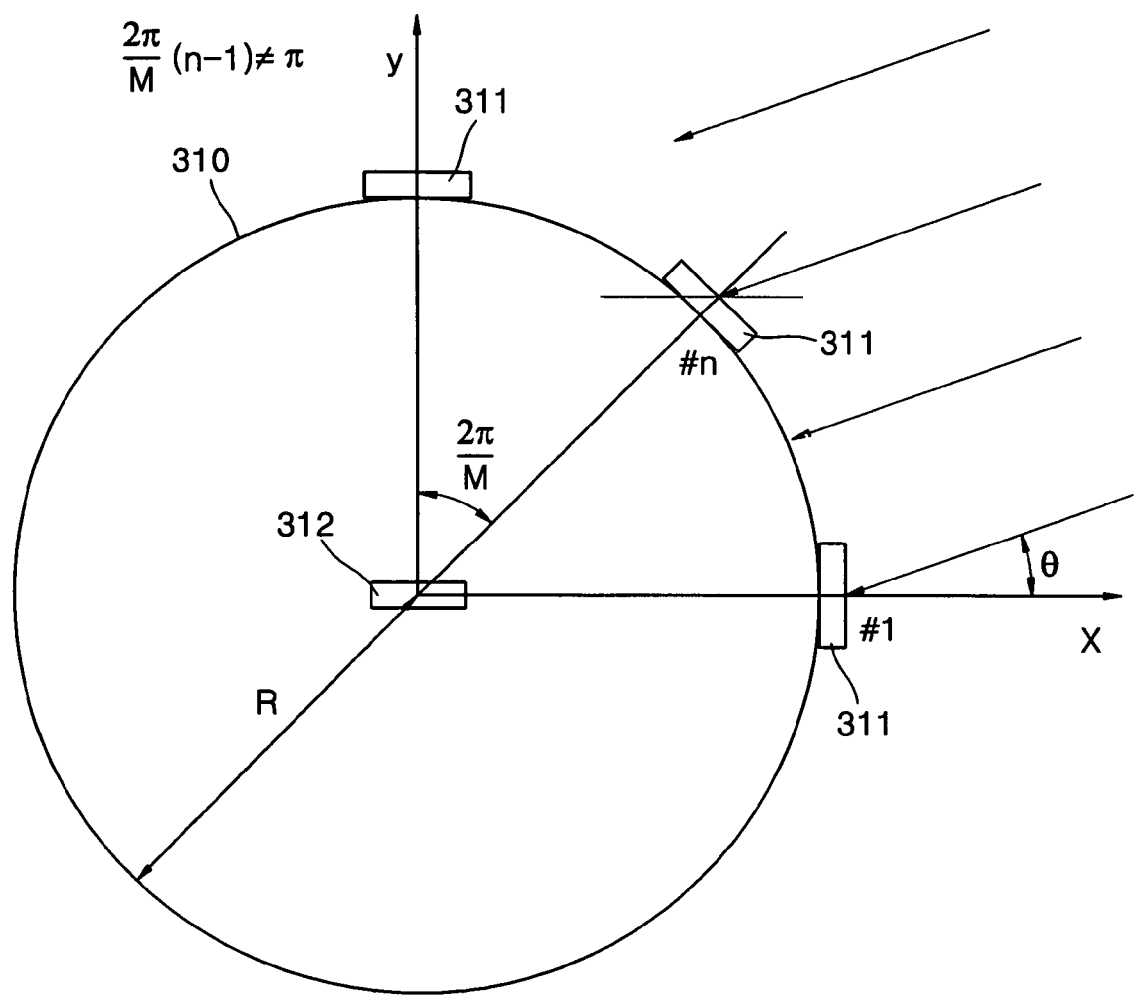
FIGS. 6A and 6B illustrate a method of calculating an incident angle θ using a supersonic wave received by a first receiving unit in a robot.
Figure 6B:
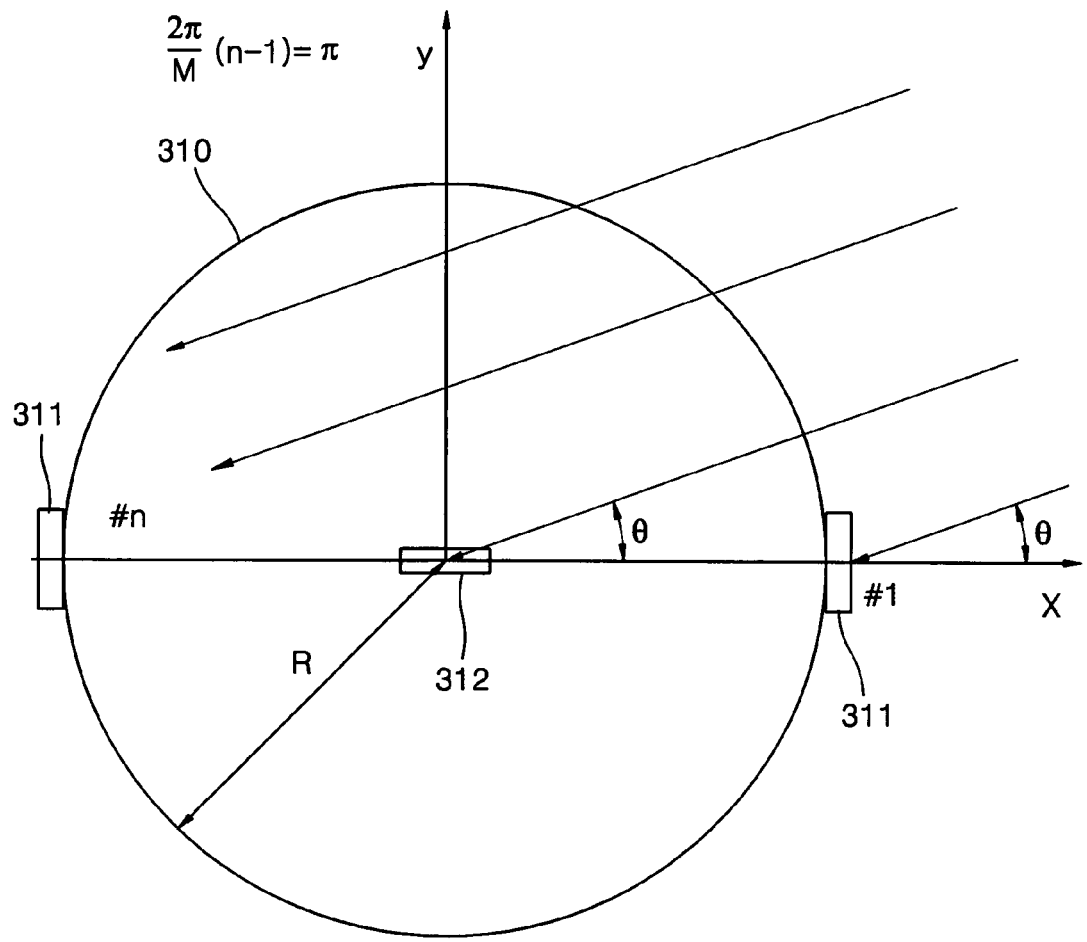

FIGS. 6A and 6B illustrate a method by which the incident angle calculation unit 313 calculates an incident angle θ using a supersonic wave received by the first receiving unit 311 of the robot 310. The incident angle calculation unit 313 calculates the incident angle θ of a supersonic wave onto the robot 310 using a time difference between receiving times of the supersonic wave by the two or more supersonic sensors provided in the first receiving unit 311, for example, using Formula (2) or (3). FIG. 6A illustrates the use of Formula (2), and FIG. 6B illustrates the use of Formula (3).

$$\text{When } \frac{2\pi}{M}(n-1) \neq \pi, \quad t_2 - t_1 = \frac{R\left(\cos\theta - \cos\left(\theta - \frac{2\pi}{M}(n-1)\right)\right)}{c} \quad (2)$$

Here, $t_1$ indicates an instant of time when the supersonic wave is received by a first supersonic sensor, $t_2$ indicates an instant of time when the supersonic wave is received by a second supersonic sensor, R indicates a radius of a circle, which has the center (O' shown in FIG. 2) of the robot 310 as the origin and on the circumference of which the supersonic sensors are installed, M indicates the number of supersonic sensors, and c indicates the speed of sound, i.e., 340 m/sec, n indicates a sequence in which the supersonic wave is received by the supersonic sensors when the first supersonic sensor is fixed as a reference sensor for measurement of the incident angle θ of the supersonic wave on the basis of the center O' of the robot 310.

However, when $$\frac{2\pi}{M}(n-1) = \pi,$$

for example, when two supersonic sensors are provided in the first receiving unit 311, the incident angle θ is calculated according to Formula (3).

$$\theta = \cos^{-1}\left(\frac{(t_2 - t_1) \cdot c}{2R}\right) \tag{3}$$

The robot 310 can determine the position and the direction of the docking station 300 from (L, θ) using Formulae (1) through (3). However, the docking station 300 cannot determine the current position of the robot 300 only from (L, θ). Referring to FIG. 4, many positions can be defined by (L, θ). Only when γ is set, the current position of the robot 310 can be determined, and simultaneously, the direction toward the robot 310 is oriented can be also determined. Hereinafter, it will be explained how to estimate γ with encoder signals using the Kalman filter.

The encoder 315 measures a change between a previous position and a current position and a change between a previous orientation and a current orientation. Then, the encoder 315 informs the robot 310 of the measured changes, and based on this the robot 310 controls its position or orientation. It is possible to currently localize the robot 310 by integrating differences given by changes in a position and an orientation of the robot 310 using the encoder 315. If an integration error does not occur, localization of the robot 310 is possible only with the encoder 315. As in a case of using an odometer, such localization using the encoder 315 is roughly accurate during a short period of time, but integration errors accumulate quickly due to sampling errors.

The state observer 316 estimates the current position and orientation of the robot 310 with respect to the docking station 300 using the distance L, incident angle θ, and the positional change and the orientation change measured by the encoder 315. The state observer 316 may include a Kalman filter.

Figure 7:
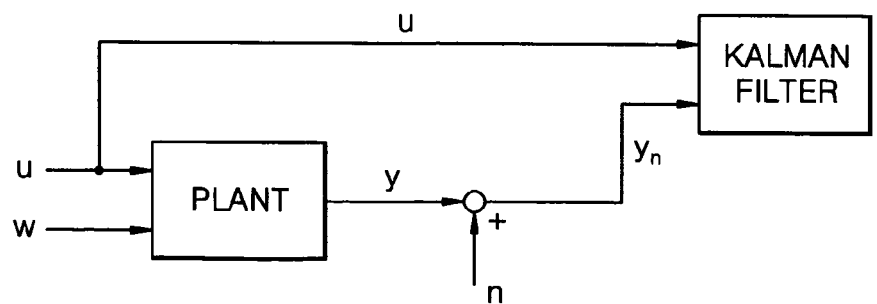
FIG. 7 is a block diagram of an example of a Kalman filter.

FIG. 7 is a block diagram of an example of a Kalman filter. When the dynamic equation of a system is given as y=Cx+Du+Hw, the Kalman filter calculates an optimized output and a state estimation vector using a known input value u and a measurement value $y_n$ containing a measurement noise n.

In the robot localization system shown in FIG. 3, a position and an orientation of the robot 310 can be determined using Formula (4), based on the coordinate system having the docking station 300 as the origin, as presented in FIGS. 2 and 4.

$$\dot{x}(t) = v(t)\cos \gamma(t)$$

$$\dot{y}(t) = v(t)\sin \gamma(t)$$

$$\dot{\gamma}(t) = \omega(t) \tag{4}$$

Here, v(t) indicates a linear velocity command, and ω(t) indicates an angular velocity command.

Accordingly, a discrete system modeling of the robot localization system of the present invention is expressed using Formula (5).

$$dX(t) = F(X(t), U(t))dt + d\eta(t)$$

$$X(t) = [x(t) y(t) \gamma(t)]^T$$

$$U(t) = [v(t) \omega(t)]$$

$$F(X(t), U(t)) = [v(t)\cos \gamma(t) v(t)\sin \gamma(t) \omega(t)]^T$$

$$E(d\eta(t) \cdot d\eta(t)^T) = Q(t)dt \tag{5}$$

Here, η(t) indicates noise in the discrete system, E(*) indicates an average of *, and Q(t) indicates a covariance matrix of noise.

Modeling for measurement of the robot localization system of the present invention is expressed using Formula (6).

$$Z((k+1)T) = G(X(k+1) + \mu(kT) \tag{6}$$

$$Z(kT) = [x(kT)\ y(kT)\ \gamma(kT)\ L(kT)\ \theta(kT)]$$

$$G(X(kT)) = \begin{bmatrix} x(kT) \\ y(kT) \\ \gamma(kT) \\ \sqrt{x^2(kT) + y^2(kT)} \\ \gamma(kT) + \pi - \tan^{-1}\left(\frac{y(kT)}{x(kT)}\right) \end{bmatrix}$$

Here, T indicates a sampling time. μ(kT) indicates measurement noise of the encoder 315 or the first receiving unit 311. x(kT), y(kT), and γ(kT) indicate position and orientation values of the robot 310 measured using the encoder 315. L(kT) and θ(kT) indicate a distance between the robot 310 and the docking station 300 and direction of the docking station 300 measured using the first receiving unit 311.

When a unit for measuring an absolute azimuth of the robot 310, for example, a gyroscope or a magnetic compass, is provided, γ(kT) can be replaced with a value measured by this absolute azimuth measurement unit.

Figure 8:
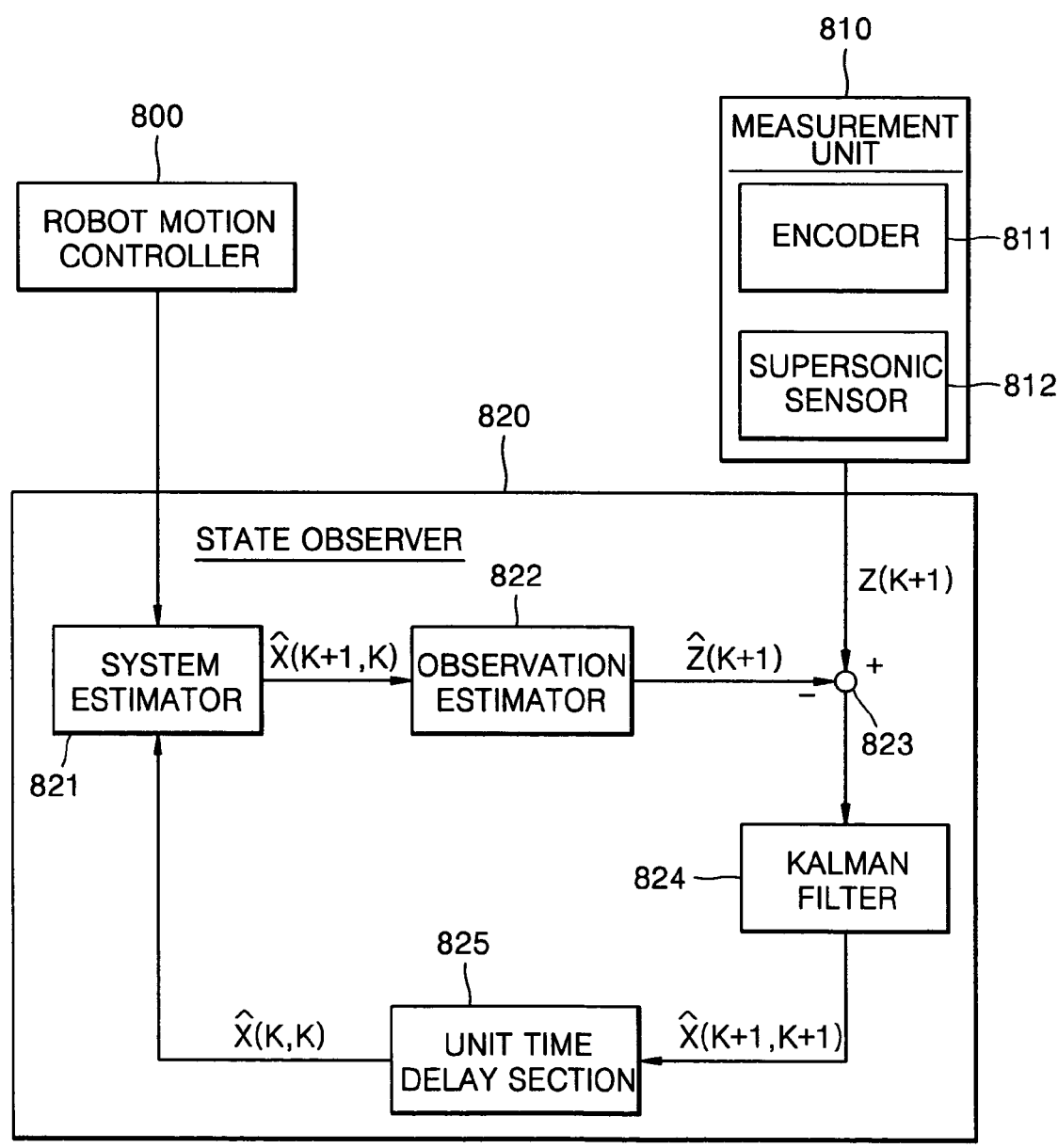
FIG. 8 is a block diagram of a robot localization system according to another embodiment of the present invention.

FIG. 8 is a block diagram of a robot localization system according to another embodiment of the present invention. The robot localization system includes a robot motion controller 800, a measurement unit 810, and a state observer 820. The state observer 820 includes a system estimator 821, an observation estimator 822, an adder 823, a Kalman filter 824, and a unit time delay section 825.

The robot motion controller 800 outputs a linear velocity command (v(t)) and an angular velocity command (ω(t)) in order to change a position and an orientation of the robot. In response to the linear velocity command and the angular velocity command, the system estimator 821 outputs a system estimation vector $\hat{X}(k+1,k)$. The system estimation vector $\hat{X}(k+1,k)$ is expressed using Formula (7).

$$\hat{X}(k+1, k) = \hat{X}(k, k) + L(k)U(k) \tag{7}$$

$$L(k) = \begin{bmatrix} T\cos\gamma(k) & -0.5v(k-1)T^2\sin\gamma(k) \\ T\sin\gamma(k) & 0.5v(k-1)T^2\cos\gamma(k) \\ 0 & T \end{bmatrix}$$

Here, L(k) indicates a transformation matrix which linearizes U(k).

The observation estimator 822 converts the system estimation vector $\hat{X}(k+1, k)$ into an observation estimation vector $\hat{Z}(k+1)$. The observation estimation vector $\hat{Z}(k+1)$ is expressed as Formula (8) when the sampling time is 1.

$$\hat{Z}(k+1) = G(\hat{X}(k+1,k)) + \mu(k) \quad (8)$$

The measurement unit 810 outputs a position measurement value Z(k+1) of the robot using an encoder 811, a supersonic sensor 812, etc. The adder 823 adds the position measurement value Z(k+1) and the observation estimation vector $\hat{Z}$(k+1). The Kalman filter 824 calculates an optimal estimation vector $\hat{X}$(k+1, k+1) using Formula (9).

$$\hat{X}(k+1,k+1) = \hat{X}(k+1,k) + K(k+1) \cdot [Z(k+1) - \hat{Z}(k+1)] \quad (9)$$

To calculate the optimal estimation vector $\hat{X}$(k+1, k+1), the Kalman filter 824 uses parameters shown in Formula (10).

$$K(k+1) = P(k+1,k) C^T(k+1) \cdot [C(k+1) P(k+1,k) C^T(k+1) + R(k+1)]^{-1}$$

$$P(k+1,k) = A_d(k) P(k,k) A_d^T(k) + Q_d(k)$$

$$P(k+1,k+1) = [I - K(k+1) C(k+1)] \cdot P(k+1,k)$$

$$A_d(k) \equiv \begin{bmatrix} 1 & 0 & -v(k-1)T\sin\gamma(k) \\ 0 & 1 & v(k-1)T\cos\gamma(k) \\ 0 & 0 & 1 \end{bmatrix}$$

$$Q_d(k) \equiv \sigma_\eta^2(k) \overline{Q}(k)$$

$$\overline{Q} \equiv \begin{bmatrix} T + v(k-1)^2 \frac{T^3}{3} \sin^2\gamma(k) & -v(k-1)^2 \frac{T^3}{3} \cos\gamma(k)\sin\gamma(k) & v(k-1)\frac{T^2}{2}\sin\gamma(k) \\ -v(k-1)^2 \frac{T^3}{3} \cos\gamma(k)\sin\gamma(k) & T + v(k-1)^2 \frac{T^3}{3} \cos^2\gamma(k) & v(k-1)\frac{T^2}{2}\cos\gamma(k) \\ -v(k-1)\frac{T^2}{2}\sin\gamma(k) & v(k-1)\frac{T^2}{2}\cos\gamma(k) & T \end{bmatrix}$$

$$C(k) \equiv \begin{bmatrix} 1 & 0 & 0 \\ 0 & 1 & 0 \\ 0 & 0 & 1 \\ x(k)(x^2(k)+y^2(k))^{-0.5} & y(k)(x^2(k)+y^2(k))^{-0.5} & 0 \\ \frac{y(k)}{x^2(k)+y^2(k)} & -\frac{x(k)}{x^2(k)+y^2(k)} & 1 \end{bmatrix}$$

The unit time delay section 825 updates a time step in a discrete analysis based on time-marching. In other words, due to the operation of the unit time delay section 825, a current optimal estimation vector $\hat{X}$(k+1, k+1) becomes a previous optimal estimation vector $\hat{X}$(k,k), which is used in a subsequent calculation.

Figure 9:
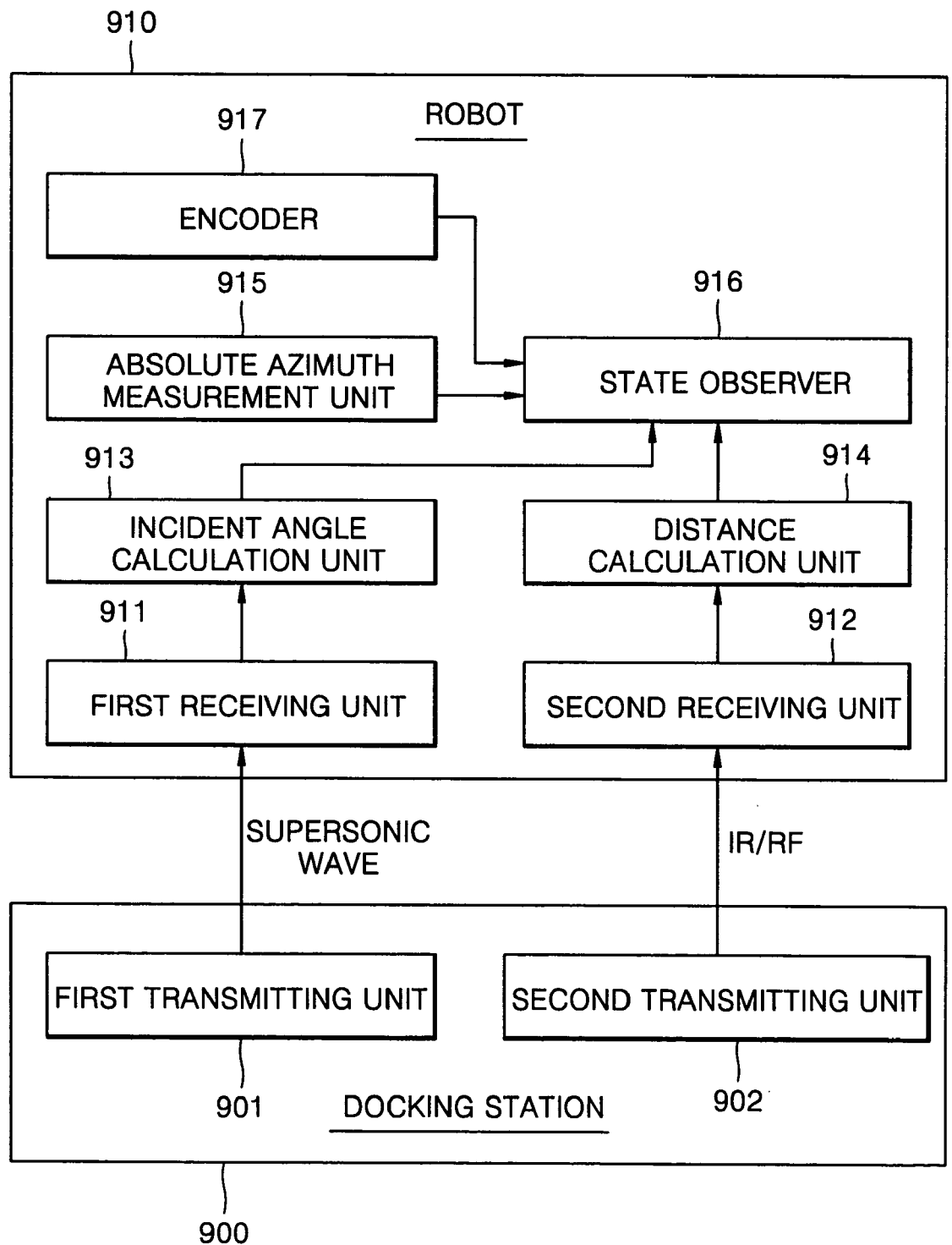
FIG. 9 is a block diagram of a robot localization system according to still another embodiment of the present invention.

FIG. 9 is a block diagram of a robot localization system according to another embodiment of the present invention. The robot localization system includes a docking station 900 and a robot 910. Preferably, the docking station 900 includes a first transmitting unit 901 and a second transmitting unit 902. Preferably, the robot 910 includes a first receiving unit 911, a second receiving unit 912, an incident angle calculation unit 913, a distance calculation unit 914, an absolute azimuth measurement unit 915, and a state observer 916. Instead of the encoder 315 shown in FIG. 3, the absolute azimuth measurement unit 915 is used.

The encoder 917 measures a change between a previous position and a current position and a change between a previous orientation and a current orientation.

The absolute azimuth measurement unit 915 measures an absolute azimuth ($\gamma$) of the robot 910. The absolute azimuth measurement unit 915 may be implemented as a gyroscope or a magnetic compass. Since the absolute azimuth measured by, for example, a gyroscope contains measurement noise, the state observer 916 including a Kalman filter is used to obtain an optimal output.

In the above embodiments, the structure and operations of a robot localization system using a sound wave, and particularly, a supersonic wave have been described.

Figure 10:
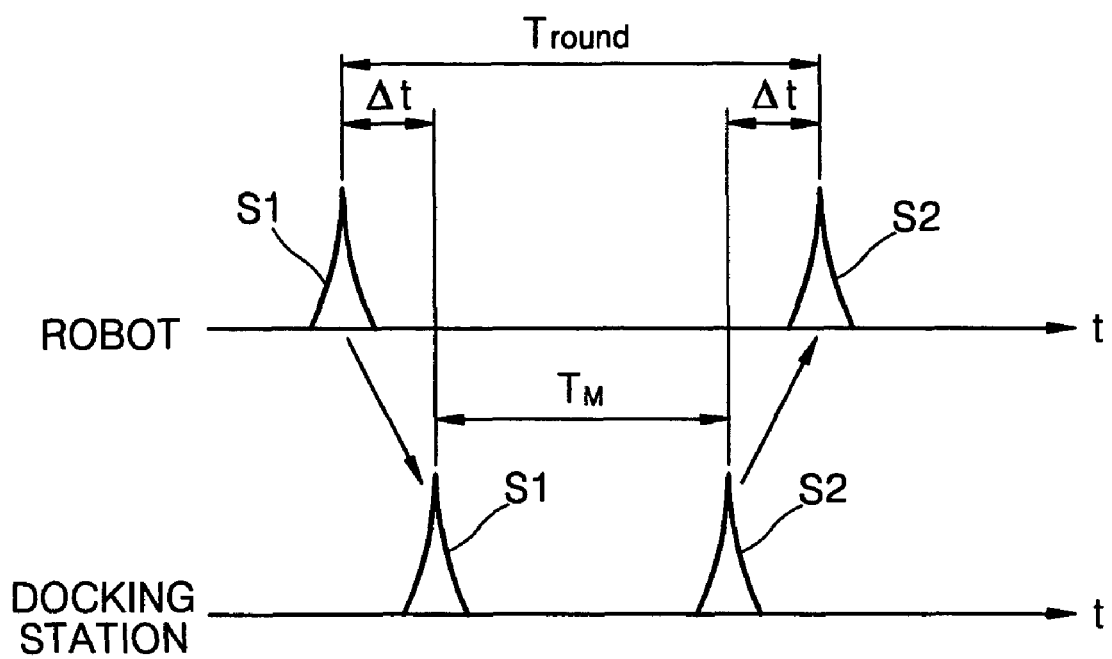
FIG. 10 is a diagram illustrating a method of measuring a distance between a robot and a docking station using a radio wave.

Hereinafter, an embodiment of a robot localization system using a radio wave will be described. FIG. 10 is a diagram illustrating a method of measuring a distance between a robot and a docking station using a radio wave.

$$L = \Delta t \cdot c_L \quad (1)$$

Here, $c_L$ indicates the speed of light, and $\Delta t$ indicates a time difference between an instant of time when the robot transmits a first radio wave and an instant of time when the docking station receives the first radio wave.

Referring to FIG. 10, the robot transmits a first radio wave S1, and then the docking station receives the first radio wave S1 after the time difference $\Delta t$. A predetermined period of time $T_M$ after receiving the first radio wave S1, the docking station transmits a second radio wave S2. Then, the robot receives the second radio wave S2 after the time difference $\Delta t$. Accordingly, when a time from the transmission of the first radio wave S1 to the reception of the second radio wave S2 is represented by $T_{round}$, $\Delta t$ can be defined by Formula (12).

$$\Delta t = \frac{T_{round} - T_M}{2} \quad (12)$$

Here, in view of the robot, $T_{round}$ is a measured value, and $T_M$ is a known value.

To measure a distance between the robot and the docking station using Formulae (11) and (12), the robot includes a first transmitter, a second receiver, and a distance calculator, and the docking station includes a first receiver and a second transmitter.

The first transmitter transmits a first radio wave. The first transmitter is disposed at an appropriate position, for example, the position denoted by the reference numeral 312 shown in FIG. 5, in the robot.

The second receiver receives a second radio wave. The second receiver is disposed at an appropriate position, for example, the position denoted by the reference numeral 311 shown in FIG. 5, in the robot. In order to measure only a distance, the second receiver includes only a single radio wave sensor.

Accordingly, the second receiver is disposed at only one appropriate position among the positions denoted by the reference numeral 311.

The distance calculator calculates, for example, the distance L between the robot 310 and the docking station 300 shown in FIG. 5, using Formulae (11) and (12).

The first receiver receives the first radio wave. The first receiver is disposed at an appropriate position, for example, the position denoted by the reference numeral 301 shown in FIG. 5, in the docking station.

The second transmitter transmits the second radio wave. The second transmitter is disposed at an appropriate position, for example, the position denoted by the reference numeral 302 shown in FIG. 5, in the docking station.

In a robot localization system using a radio wave according to another embodiment of the present invention, the robot may include at least two radio wave sensors in the second receiver in order to determine an orientation of the docking station. For example, each radio wave sensor may be disposed at one of the positions denoted by the reference numeral 311 shown in FIG. 5. A method of calculating an incident angle of the second radio wave onto the robot using a radio wave is the same as the method of calculating an incident angle of a supersonic wave using Formulae (2) and (3), described with reference to FIGS. 6A and 6B.

The structure and operations of the robot localization system using a radio wave are the same as those of the robot localization system using a supersonic wave, with the exception that a radio wave is used instead of a supersonic wave.

As described above, according to a robot localization system of the present invention, a position and a direction toward a stationary docking station can be measured using a single beacon provided in the docking station and a supersonic sensor provided in a robot. In addition, it is possible to localize the robot with respect to the docking station using an additional Kalman filter. In addition, robot localization using a radio wave is also possible.

Although a few embodiments of the present invention have been shown and described, it will be appreciated by those skilled in the art that changes may be made in these elements without departing from the principles and spirit of the invention, the scope of which is defined in the appended claims and their equivalents.

What is claimed is:

1. A robot localization system comprising:
 a first transmitter which transmits a first radio wave;
 a second receiver having at least two sensors which receives a second radio wave;
 a distance calculator which calculates a distance between the robot and a docking station based on the first transmitted radio wave and the received second radio wave;
 an incident angle calculator which calculates an incident angle of the second radio wave onto the robot using a difference between receiving times of the second radio wave in the at least two sensors of the second receiver;
 an encoder to measure movements of the robot, with the encoder measuring a positional change between a previous position of the robot and a current position of the robot and a directional change of the robot between a previous direction the robot was orientated toward and a current direction the robot is orientated toward, based on the measured movements of the robot between the previous position and the current position; and
 a state observer, which estimates respective unique values, within a space, of an estimated current position and an estimated current orientation of the robot with respect to the docking station, distinct from a current position and orientation measured by the encoder, by collectively using the distance between the robot and the docking station, the incident angle of the second radio wave, the positional change from the encoder, and the directional change from the encoder,
 wherein the docking station comprising:
 a first receiver which receives the first radio wave; and
 a second transmitter which transmits the second radio wave a predetermined period of time after the first radio wave is received.

2. The robot localization system of claim 1, wherein the state observer comprises a Kalman filter which estimates the orientation of the robot using the positional and directional changes measured by the encoder.

3. The robot localization system of claim 1, wherein the distance calculator calculates the distance between the robot and the docketing station using a difference between an instant of time when the first radio wave is transmitted and an instant of time when the second radio wave is received and a predetermined period of time from the reception of the first radio wave to the transmission of the second radio wave.

4. A localization method of a robot having a first transmitter which transmits a first radio wave and a second receiver having at least two sensors which receives a second radio wave, the method comprising:
 calculating a distance between the robot and a docking station, with the docking station having a first receiver which receives the first radio wave and a second transmitter which transmits the second radio wave a predetermined period of time after the first radio wave is received, based on the first transmitted radio wave and the received second radio wave;
 calculating an incident angle of the second radio wave onto the robot using a difference between receiving times of the second radio wave in the at least two sensors comprised in the second receiver;
 measuring movements of the robot, including measuring a positional change between a previous position of the robot and a current position of the robot and a directional change of the robot between a previous direction the robot was orientated toward and a current direction the robot is orientated toward, based on the measured movements of the robot between the previous position and the current position; and
 estimating respective unique values, within a space, of an estimated current position and an estimated current orientation of the robot with respect to the docking station, distinct from a current position and orientation of the robot measured by the measuring of the movements of the robot, by collectively using the distance between the robot and the docking station, the incident angle of the second radio wave, the positional change, and the directional change.

5. The localization method of claim 4, wherein the calculating of the distance between the robot an the docking station uses a difference between an instant of time when the first radio wave is transmitted and an instant of time when the second radio wave is received and a predetermined period of time from the reception of the first radio wave to the transmission of the second radio wave.

* * * * *

UNITED STATES PATENT AND TRADEMARK OFFICE
CERTIFICATE OF CORRECTION

PATENT NO.        : 7,970,491 B2                     Page 1 of 1
APPLICATION NO.   : 10/747228
DATED             : June 28, 2011
INVENTOR(S)       : Hyoung-ki Lee et al.

It is certified that error appears in the above-identified patent and that said Letters Patent is hereby corrected as shown below:

Column 10, Line 20, In Claim 3, delete "docketing" and insert -- docking --, therefor.

Column 10, Line 58, In Claim 5, delete "an" and insert -- and --, therefor.

Signed and Sealed this
Fourteenth Day of February, 2012

David J. Kappos
*Director of the United States Patent and Trademark Office*